(12) United States Patent
Nakatsuka et al.

(10) Patent No.: US 10,837,886 B2
(45) Date of Patent: Nov. 17, 2020

(54) CONNECTION STRENGTH MEASUREMENT METHOD

(71) Applicant: DAICEL CORPORATION, Osaka (JP)

(72) Inventors: Naoki Nakatsuka, Tatsuno (JP); Masakazu Tokuda, Tatsuno (JP); Masayuki Nakayasu, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 273 days.

(21) Appl. No.: 15/751,256

(22) PCT Filed: Aug. 23, 2016

(86) PCT No.: PCT/JP2016/074433
§ 371 (c)(1),
(2) Date: Feb. 8, 2018

(87) PCT Pub. No.: WO2017/038539
PCT Pub. Date: Mar. 9, 2017

(65) Prior Publication Data
US 2018/0246021 A1 Aug. 30, 2018

(30) Foreign Application Priority Data

Sep. 3, 2015 (JP) ................................ 2015-173696

(51) Int. Cl.
*G01N 3/04* (2006.01)
*G01N 3/08* (2006.01)
*G01N 19/04* (2006.01)

(52) U.S. Cl.
CPC .................. *G01N 3/04* (2013.01); *G01N 3/08* (2013.01); *G01N 19/04* (2013.01)

(58) Field of Classification Search
CPC ............. G01N 3/04; G01N 19/04; G01N 3/08
See application file for complete search history.

(56) References Cited

U.S. PATENT DOCUMENTS

| 6,289,741 | B1* | 9/2001 | Ghetzler | G01N 3/08 73/150 A |
| 2003/0151241 | A1 | 8/2003 | Matsuda et al. | |
| 2007/0151360 | A1* | 7/2007 | Ring | B21D 41/02 73/834 |

FOREIGN PATENT DOCUMENTS

| CN | 1868980 A | 11/2006 |
| CN | 201622207 U | 11/2010 |

(Continued)

OTHER PUBLICATIONS

International Preliminary Report on Patentability and English translation of the Written Opinion of the International Searching Authority (Forms PCT/IB/373 and PCT/ISA/237), dated Mar. 6, 2018, for International Application No. PCT/JP2016/074433.

(Continued)

*Primary Examiner* — Herbert K Roberts
*Assistant Examiner* — John M Royston
(74) *Attorney, Agent, or Firm* — Birch, Stewart, Kolasch & Birch, LLP (57) ABSTRACT

The present invention provides a method for measuring connection strength of a measuring object in which a first measurement member and a second measurement member are connected,
the measuring object being an object in which the first measurement member in the form of a cylindrical member or a cup member, and the second measurement member in the form of a cylindrical member or a cup member, are connected at respective openings thereof,
the method including:
fixing, as step 1, the first measurement member by enclosing a circumferential wall thereof from the outer circumferential wall thereof, and axially supporting but to fixing an annular end surface of an opening of the second measurement member;

(Continued)

holding in midair, as step 2, the first measurement member fixed in step 1; and pulling away, as step 3, the first measurement member until connection portions of the first measurement member and the second measurement member are separated.

5 Claims, 8 Drawing Sheets

(56) References Cited

FOREIGN PATENT DOCUMENTS

| CN | 203365238 U | 12/2013 |
|---|---|---|
| JP | 2003-226219 A | 8/2003 |
| JP | 3910897 B2 | 4/2007 |
| JP | 2009-19989 A | 1/2009 |
| JP | 4916965 B2 | 4/2012 |
| JP | 2013-11548 A | 1/2013 |
| JP | 2013011548 A * | 1/2013 |

OTHER PUBLICATIONS

International Search Report, issued in PCT/JP2016/074433, PCT/ISA/210, dated Oct. 18, 2016.
Written Opinion of the International Searching Authority, issued in PCT/JP2016/074433, PCT/ISA/237, dated Oct. 18, 2016.
Chinese Office Action and Search Report, dated Apr. 7, 2020. for Chinese Application No. 201680046457.3.

* cited by examiner

CONNECTION STRENGTH MEASUREMENT METHOD

FIELD OF INVENTION

The present invention relates to a method for measuring connection strength of two members connected together.

DESCRIPTION OF RELATED ART

In a inflators used in an airbag apparatus of an automobile, a component in which cylindrical members are connected at respective openings thereof and a component in which a cylindrical member and a cup member are connected at respective openings thereof are often used.

When such a connection component including two components is used in a product, it is necessary to measure connection strength of the connection component from the view point of quality control.

JP-B No. 4916965 discloses an invention related to a fixing method to measure connection strength between cylindrical components of an inflator.

SUMMARY OF INVENTION

A first aspect of the present invention (hereinafter referred to a "first aspect") provides a method for measuring connection strength of a measuring object in which a first measurement member and a second measurement member are connected, the measuring object being an object in which the first measurement member in the form of a cylindrical member or a cup member, and the second measurement member in the form of a cylindrical member or a cup member, are connected at respective openings thereof, the method including:

fixing, as step 1, the first measurement member by enclosing a circumferential wall thereof from the outer side, and axially supporting but not fixing an annular end surface of an opening of the second measurement member;

holding in midair, as step 2, the first measurement member fixed in step 1; and pulling away, as step 3, the first measurement member until a connection portions of the first measurement member and the second measurement member is separated.

A second aspect of the present invention (hereinafter referred to as a "second aspect") provides a method for measuring connection strength of a measuring object in which a first measurement member and a second measurement member are connected, with the use of a measurement apparatus, the measuring object being an object in which the first measurement member in the form of a cylindrical member or a cup member, and the second measurement member in the form of a cylindrical member or a cup member, are connected at respective openings thereof, the measurement apparatus including a holding unit which holds the measuring object and a load portion which applies load to the measuring object in a long axis direction, the holding unit including a first holding portion, a second holding portion, a clamping tool for the first measurement member, and an annular member, the first holding portion being formed of a first body including a first partial surface on which a portion of the annular member is placed and a first flat surface extended in a vertical direction from the first partial surface, the second holding portion being formed of a second body including a second partial surface on which a remaining portion of the annular member is placed and a second flat surface extended in a vertical direction from the second partial surface, the first flat surface of the first body of the first holding portion and the second flat surface of the second body of the second holding portion facing each other, with a gap therebetween, the clamping tool for the first measurement member including a combination of a first rod-shaped member in which a first concave portion in a semi-columnar shape is provided at the middle in a length direction thereof and the first concave portion has an annular groove, and a second rod-shaped member in which a second concave portion in a semi-columnar shape is provided at the middle in a length direction thereof and the second concave portion has an annular groove, the clamping tool further including a clamping device for clamping the first rod-shaped member and the second rod-shaped member, the annular member including an annular planar surface and an inner circumferential surface and an outer circumferential surface of the annular planar surface, the annular planar surface being abutted against the first partial surface of the first holding portion and the second partial surface of the second holding portion, an inner diameter of a central hole of the annular member having such a size that an end surface of an opening of the second measurement member is abutted against the annular planar surface, an outer diameter of an outer circumferential surface of the annular member having such a size that the annular planar surface is not positioned outside the first holding portion and the second holding portion when the annular planar surface is abutted against the first partial surface of the first holding portion and the second partial surface of the second holding portion, and the load portion being a cup member or a cylindrical member which is provided over the first holding portion and the second holding portion from respective outer circumferential surfaces thereof, the method including:

arranging, as step 1, the first concave portion of the first rod-shaped member and the second concave portion of the second rod-shaped member of the clamping tool for the first measurement member adjacent to each other to form a columnar space and disposing the annular member at a position surrounding the columnar space, passing, as step 2, the first measurement member of the measuring object through the central hole of the annular member, allowing a circumferential edge of the opening of the second measurement member of the measuring object to be abutted against and supported by the annular planar surface of the annular member so that the circumferential edge of the opening of the second measurement member is not fixed thereto but axially supported thereby, arranging the first measurement member to position inside the columnar space, then clamping with the clamping tool the first rod-shaped member and the second rod-shaped member and integrating these members with each other to fix the first measurement member, disposing, as step 3, the first rod-shaped member and the second rod-shaped member, which fix the first measurement member, in a gap between the first holding portion and the second holding portion, and at the same time, allowing the annular member to be abutted against the first partial surface of the first holding portion and the second partial surface of the second holding portion, providing, as step 4, a cup member or a cylindrical member serving as the load portion over the first holding portion and the second holding portion from the respective outer circumferential surfaces, and placing an opening of the cup member or the cylindrical member on the both ends of the integrated first and second rod-shaped members, and pressing, as step 5, the cup member or the cylindrical member to measure strength for separating the first measurement member from the second measurement member.

BRIEF DESCRIPTION OF DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

The present invention provides a method for measuring connection strength of a component obtained by connecting cylindrical members and a component obtained by connecting a cylindrical member and a cup member.

In the present invention, a measuring object including a first measurement member and a second measurement member is selected from a combination of cylindrical members, a combination of a cylindrical member and a cup member, and a combination of cup members, and the first measurement member and second measurement member are connected at respective openings thereof.

Due to this, a measuring object of the present invention has a narrow elongated cylindrical form or a columnar form.

The cylindrical member and the cup member, which are to be the first measurement member or the second measurement member, generally have a circular sectional shape in a width direction (the direction perpendicular to the long axis direction). However, the sectional shape is not limited to this and can be in the form of a triangle, a quadrangle (a square, a rectangle, a trapezoid, or the like), an ellipse, or the like.

The first and second measurement members are made of metal.

An inner diameter and an outer diameter of the first measurement member can be uniform or vary in part. A through hole or a projection can be provided in a circumferential wall of the first measurement member.

An inner diameter and an outer diameter of the second measurement member can be uniform or vary in part. A through hole or a projection can be provided in a circumferential wall of the second measurement member.

The first measurement member and the second measurement member can be identical members or different members.

A method for connecting the first measurement member and the second measurement member is not particularly limited. Examples of the connecting method can be a method including the steps of bending outward a circumferential wall on the side of an opening of the first measurement member, bending inward a circumferential wall on the side of an opening of the second measurement member, and combining the respective bent portions to be engaged with each other, a method including the steps of forming a groove or a recess at an opening of one of the measurement members and fitting the groove or the recess to a circumferential wall (or a protrusion formed on the circumferential wall) of an opening of the other measurement member, and a method including a step of welding or the like.

In step 1 of the present invention, the device for fixing the first measurement member by enclosing the circumferential wall of the first measurement member from the outer side is not particularly limited. A method of holding and fixing the circumference of the first measurement member with a clamp or the like, a method of pressing and fixing the first measurement member from the outer side with two fixing members, and the like can be employed.

Moreover, as the fixing device, it is possible to use a member having a blade or a projection to bite into the circumferential wall of the first measurement member on a surface coming in contact with the circumferential wall of the first measurement member.

A sectional shape of a portion of the fixing device coming in contact with the circumferential wall of the first measurement member is preferably identical to a sectional shape in a width direction of the first measurement member.

In step 1 of the present invention, the device for axially supporting but not fixing the annular end surface of the opening of the second measurement member does not come in contact with the circumferential wall of the second measurement member but comes in contact only with the annular end surface of the opening thereof.

As an example of the supporting device, one or two or more planar members which abut against at least a portion of the annular end surface of the opening are used.

When the planar member is made to abut against the entire annular end surface of the opening, a single annular planar member or an annular planar member obtained by combining two pieces is used as the planar member.

In step 2 of the present invention, the first measurement member fixed in step 1 is held in midair.

As described above, the measuring object of the present invention is a narrow elongated member including the first measurement member and the second measurement member, and it is necessary to separate the first measurement member from the second measurement member in step 3.

Due to this, it is necessary in step 3 to hold the first measurement member, which is fixed by the fixing device, in a space large enough to pull away the first measurement member.

As a device for holding the first measurement member in midair used in step 2, a combination of the above supporting device and two molded bodies facing each other with a gap therebetween is used.

As the two molded bodies, a molded body such as a semi-columnar column or a quadrangular column having a flat surface for supporting the supporting device is used. A form of the molded body is determined in accordance with the sectional shape in the width direction of the measuring object.

As a method for holding the first measurement member fixed by the fixing device in midair, the first measurement member and the fixing device are held in the gap between the two molded bodies by placing the supporting device across the two molded bodies.

In step 3 of the present invention, the first measurement member is pulled away until the connection portion of the first measurement member and the second measurement member is separated.

A direction of separating the first measurement member may be any one of a perpendicular direction, a horizontal direction, and an oblique direction.

The separating device in step 3 applies load to the fixing device, which fixes the first measurement member, to separate the first measurement member. Therefore, the separating device only has to apply uniform load to the entire fixing device.

For example, when the fixing device is a rod-shaped member (or a narrow elongated planar member), the separating device applies load to positions at the same length from the respective ends of the rod-shaped fixing device.

When the connection strength of a measuring object including the first measurement member and the second measurement member is measured, the first measurement member can be too deformed during measurement to measure a connection strength accurately in the case that the first measurement member is fixed with the circumference wall thereof enclosed from the outer side, but the circumference wall is thin and the measurement members are squeezed from the outer side as they moves, as disclosed in JP-B No. 4916965.

However, in the measurement method of the present invention, the second measurement is not fixed at the end surface of the opening but only axially supported, and the load is applied to axially pull away the first measurement member. Therefore, even when the circumferential wall of the first measurement member is thin, the first measurement member is hardly deformed during measurement.

Due to this, it is possible to measure the connection strength of the measuring object accurately.

It is preferable in the method for measuring the connection strength of the measuring object according to the present invention that an outer diameter ($d_1$) of the first measurement member and an inner diameter ($d_2$) of the second measurement member satisfy a relation of $d_2 \geq d_1$, and a thickness ($t_1$) of the circumferential wall of the first measurement member and a thickness ($t_2$) of the circumferential wall of the second measurement member satisfy a relation of $t_2 \geq t_1$.

When $d_2 \geq d_1$ is satisfied, it becomes easier in step 2 and 3 to axially support the annular end surface of the opening of the second measurement member without fixing.

When $t_2 \geq t_1$ is satisfied, the circumferential wall of the second measurement member is more unlikely to be deformed when the first measurement member is pulled away in step 3.

It is preferable in the method for measuring the connection strength of the measuring object according to the present invention that the opening of the second measurement member connected to the first measurement member has an annular protruding surface which protrudes inward in a radial direction of the opening, an outer diameter ($d_1$) of the first measurement member and an inner diameter ($d_2$) of the second measurement member where the annular protruding surface is not formed satisfy a relation of $d_2 \geq d_1$, and a thickness ($t_1$) of the circumferential wall of the first measurement member and a thickness ($t_2$) of the circumferential wall of the second measurement member where the annular protruding surface is not formed satisfy a relation of $t_2 \geq t_1$, and in step 2, the annular end surface of the second measurement member including the annular protruding surface is not fixed but axially supported.

With the use of the second measurement member in which the opening is provided with the annular protruding surface and the relation of $d_2 \geq d_1$ is satisfied, it is easier to axially support the annular end surface of the opening of the second measurement member without fixing in steps 2 and 3.

Furthermore, since the relation of $t_2 \geq t_1$ is satisfied, the circumferential wall of the second measurement member is more unlikely to be deformed when the first measurement member is pulled away in step 3.

It is preferable in the method of measuring the connection strength of the measuring object according to the present invention that the first measurement member has a flange at an opening thereof, the second measurement member has an annular wall formed on the annular end surface of the opening so as to axially protrude, and the flange of the first measurement member and the annular wall of the second measurement member are connected by being bent in opposite directions.

Such a connection method is a known method, for example, a connection method, disclosed in FIGS. 1 and 2 of JP 3910897 B, including a step of crimping a flange 46 of a cap 41 and a crimping portion 48 of a gas generator housing 32 to fix to each other (engaged by being bent outward and inward, respectively).

It is preferable in the method for measuring the connection strength of the measuring object according to the first aspect that the device for fixing the first measurement member used in step 1 by enclosing the circumferential wall of the first measurement member from the outer side is a combination of two rod-shaped fixing devices capable of clamping and fixing the circumferential wall of the first measurement member at a middle in a length direction thereof from the outer side, the device for axially supporting but not fixing the annular end surface of the opening of the second measurement member is an annular member disposed at the middle in the length direction of the two rod-shaped fixing devices, the annular member having a hole having a shape and a size such that the first measurement member passes through the hole, a device used in step 2 for holding the first measurement member fixed in step 1 in the midair is a first holding portion and a second holding portion disposed to face each other with a gap therebetween so that the annular member is placed across the first holding portion and the second holding portion, a device used in step 3 for pulling away the first measurement member until the connection portion of the first measurement member and the second measurement member is separated is a cup member or a cylindrical member which is fitted over an outer side of the second measurement member such that an end surface of the opening thereof is abutted against both ends of the two rod-shaped fixing devices, in step 1, the annular member is disposed at the middle in the length direction of the two rod-shaped fixing devices, then the first measurement member is passed through the hole of the annular member so that the annular end surface of the opening of the second measurement member is axially supported but not fixed, and thereafter, the circumferential wall of the first measurement member is clamped and fixed from the outer side by the two rod-shaped fixing devices, in step 2, the annular member is placed across both the first holding portion and the second holding portion so that the two rod-shaped fixing devices and the first measurement member are disposed in the gap between the first holding portion and the second holding portion in a state of being held in the midair, and in step 3, the cup member or the cylindrical member is provided from the second measurement member so that the end surface of the opening of the cup member or the cylindrical member is abutted against the both ends of the two rod-shaped fixing devices, and the cup member or the cylindrical member is pressed until the connection portion of the first measurement member and the second measurement member is separated.

In the measurement method of the present embodiment, since the second measurement member is hardly deformed during measurement, the connection strength of the measuring object in which the first measurement member and the second measurement member are connected is measured accurately.

The cylindrical member and the cup member, which are to be the first measurement member or the second measurement member of the measuring object, generally has a circular sectional shape in a width direction (the direction perpendicular to the long axis direction). However, the sectional shape is not limited to this and can be in the form of a triangle, a quadrangle (a square, a rectangle, a trapezoid, or the like), an ellipse, or the like.

The sectional shape of the respective components of the measurement apparatus is adjusted to correspond to a sectional shape in a width direction of the cylindrical member and the cup member, which are to be the first measurement member or the second measurement member of the measuring object, so that measurement is facilitated.

In the present measurement method, a direction (that is, the long axis direction of the measuring object) of pressing the load to separate the first measurement member from the second measurement member may be any one of a perpendicular direction, a horizontal direction, and an oblique direction.

In the measurement method of the present invention, since the first measurement member and the second measurement member are hardly deformed during measurement, the connection strength of the measuring object in which the first measurement member and second measurement member are connected s measured accurately.

It is preferable in the method for measuring the connection strength of the measuring object according to the second aspect that the first body of the first holding portion and the second body of the second holding portion have a semicircular planar shape, the first body of the first holding portion, the second body of the second holding portion, and the gap together form a circle, and the connection strength is measured in a state in which a center of the circle, a center of the first measurement member fixed by the first rod-shaped member and the second rod-shaped member, a center of the annular member, a center of the second measurement member, and a center of the load portion coincide with one another.

As described above, when measurement is conducted in a state in which the centers of the respective members of the measurement apparatus coincide with one another, since uniform force is applied to the first and second rod-shaped members particularly in step 5, it is possible to conduct the measurement more accurately.

According to the measurement method of the present invention, connection strength of the first measurement member and the second measurement member is measured in a state in which the first measurement member is fixed by being enclosed from the outer side and the second measurement member is not fixed but only axially supported during measurement.

Due to this, since the second measurement member is not deformed during measurement, the connection strength of the first measurement member and the second measurement member is measured accurately.

According to the measurement method of the present invention, connection strength of a measuring object in which the first measurement member in the form of a cylindrical member or a cup member, and the second measurement member, in the form of a cylindrical member or a cup member, are connected at respective openings thereof is measured accurately.

Due to this, it is possible to measure connection strength of a measuring object in various fields accurately and, in particular, to measure connection strength of a measuring object used in a gas generator of an airbag apparatus accurately. Therefore, the present invention is useful in improvement of the quality of the gas generator.

Embodiments of Invention

<Measuring Object>

Figure 1:
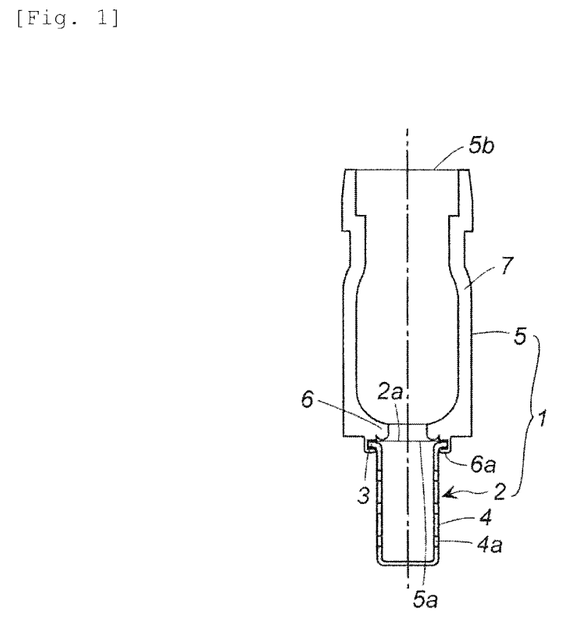
FIG. 1 shows a cross-sectional view in an axial direction of a measuring object for a measurement method according to the present invention.

FIG. 1 illustrates a measuring object 1 for implementing a measurement method of the present invention.

A first measurement member 2 in the form of a cup member and a second measurement member 5 in the form of a cylindrical member are connected at respective openings thereof.

The first measurement member 2 and the second measurement member 5 have a circular sectional shape in a width direction (a radial direction).

The first measurement member (the cup member) 2 has a flange 3 at an opening 2a and a plurality of through-holes 4a in a circumferential wall 4.

The second measurement member (the cylindrical member) 5 has a first end opening 5a the side of the first measurement member 2 and a second end opening 5b on the axially opposite side thereof, and has an annular protruding surface 6 at the opening 5a, which protrudes radially inward.

In FIG. 1, an outer diameter of the circumferential wall 7 of the second measurement member 5 varies partially, but the outer diameter may be uniform.

A thickness of the annular protruding surface 6 may be almost the same as a thickness of the circumferential wall 7 where the annular protruding surface 6 is not formed.

An inner diameter of the annular protruding surface 6 is smaller than an inner diameter of the circumferential wall 7 where the annular protruding surface 6 is not formed.

The annular protruding surface 6 has an annular wall 6a which protrudes axially towards the first measurement member 2.

An outer diameter (d1) of the first measurement member 2 and an inner diameter (d2) of the second measurement member 5 satisfy a relation of d2>d1, and a thickness (t1) of the circumferential wall 4 of the first measurement member 2 and a thickness (t2) of the circumferential wall 7 of the second measurement member 5 satisfy a relation of t2>t1.

The annular wall 6a of the second measurement member 5 is bent inward and the flange 3 of the first measurement member 2 is held in the thickness direction by the bent portion of the annular wall 6a, and thereby the first measurement member 2 and the second measurement member 5 are fixed to each other.

<Measurement Apparatus>

A measurement apparatus suitable for implementing the method for measuring the measuring object 1 which includes the first measurement member 2 and the second measurement member 5 shown in FIG. 1, will be described with reference to FIGS. 2 to 6.

Figure 2:
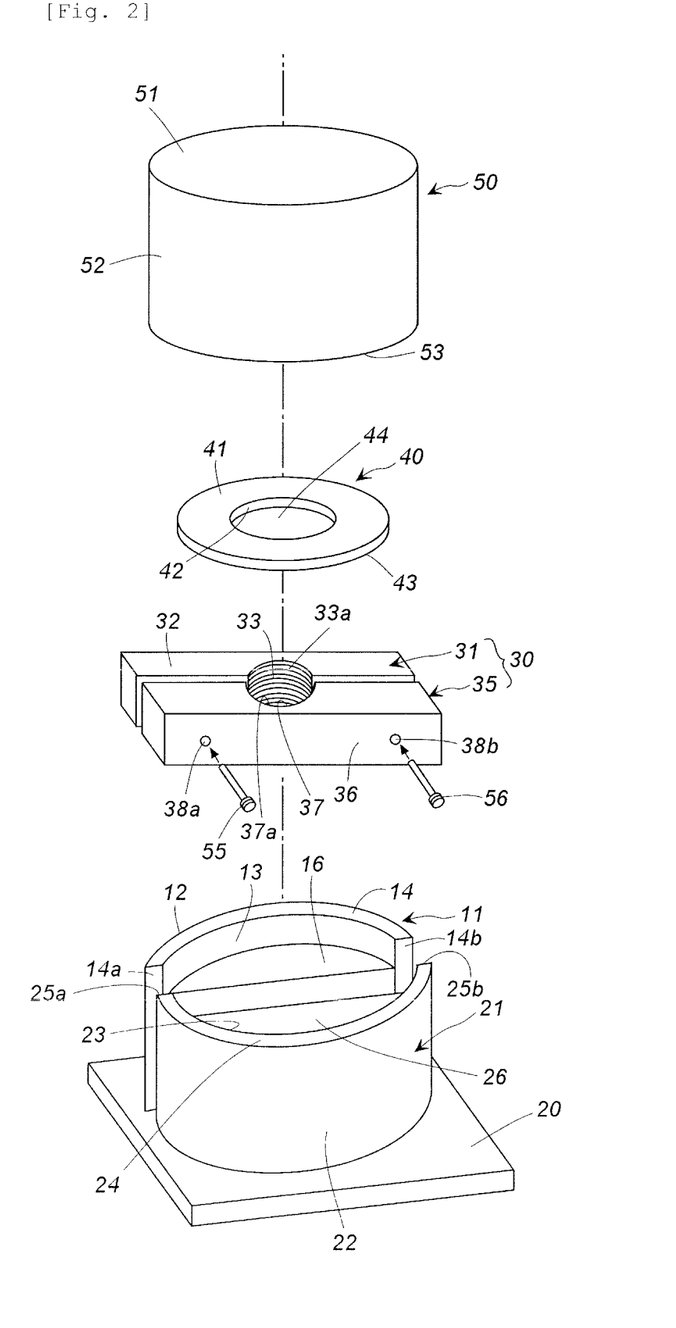
FIG. 2 shows an exploded perspective view of a measurement apparatus for implementing the measurement method according to the present invention (a measuring object is not shown)

A holding unit for the measuring object includes a first holding portion, a second holding portion, a clamping tool for the first measurement member, and an annular member.

Figure 3:
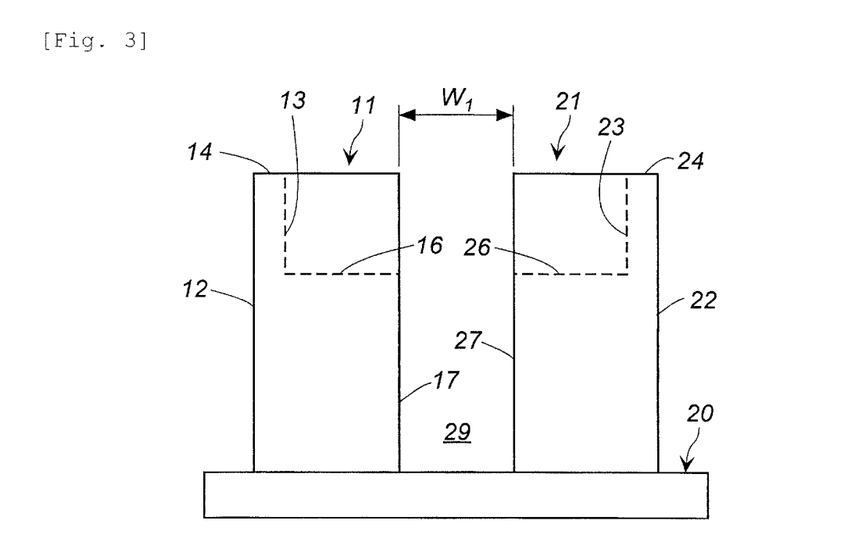
FIG. 3 shows a front view of a first holding portion, a second holding portion, and a substrate shown in FIG. 2.

As shown in FIGS. 2 and 3, the first holding portion 11 and the second holding portion 21 are fixed on a substrate 20.

The first holding portion 11 has a first outer circumferential surface (a curved surface) 12, a first inner circumferential surface (a curved surface) 13, a first arc-shaped end surface 14 on the axially opposite side of the substrate 20, and a first side surface 14a and a second side surface 14b at lateral sides thereof respectively.

A first partial circular surface 16 is provided on the side of the first inner circumferential surface 13, and a first flat surface 17 extends from the first partial circular surface 16 to the substrate 20. The first flat surface 17 is a perpendicular surface extending from the substrate 20. The first side surface 14a and the second side surfaces 14b are contiguous to the first flat surface 17, and these surfaces may be flush with one another.

Bolt holes may be formed in four corners of the substrate 20 as necessary so that the substrate 20 can be fixed to a measurement table by bolts.

The second holding portion 21 has a second outer circumferential surface (a curved surface) 22, a second inner circumferential surface (a curved surface) 23, a second arc-shaped end surface 24 on the axially opposite side of the substrate 20, and a first side surface 25a and a second side surface 25b at lateral sides thereof respectively.

A second partial circular surface 26 is provided on the side of the second inner circumferential surface 23, and a second flat surface 27 extends from the second partial circular surface 26 to the substrate 20. The second flat surface 27 is a perpendicular surface extending from the substrate 20. The first side surface 25a and the second side surfaces 25b are contiguous to the second flat surface 27, and these surfaces may be flush with one another.

The first holding portion 11 and the second holding portion 21 are disposed such that the first flat surface 17 and the second flat surface 27 face each other with a gap 29 (a distance W1) therebetween.

The first holding portion 11 and the second holding portion 21 are disposed such that a planar shape including the gap 29 between the first and second flat surfaces 17, 27 is circular.

Figure 4:
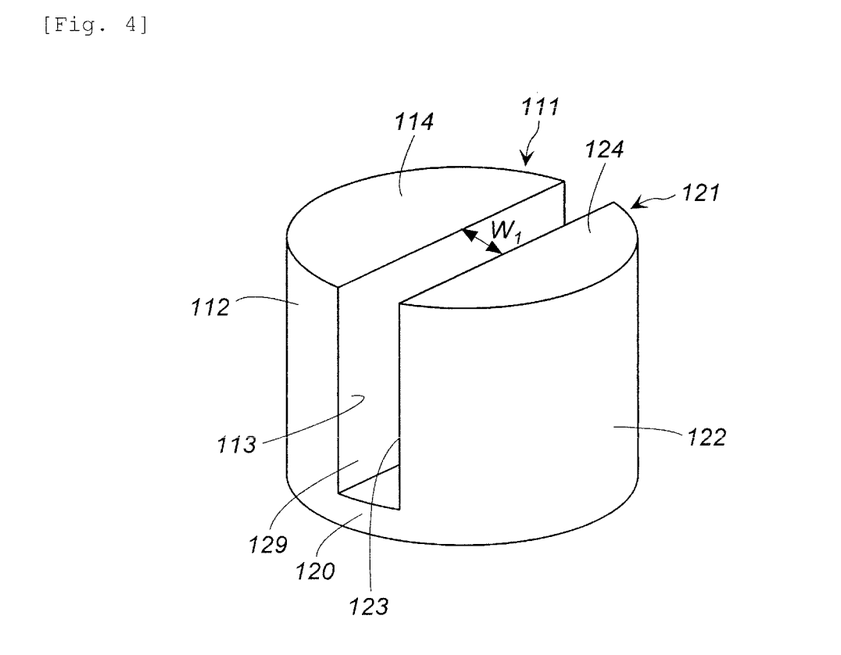
FIG. 4 shows a perspective view of another embodiment of the first holding portion, the second holding portion, and the substrate portion shown in FIG. 2.

Instead of the first holding portion 11 and the second holding portion 21 shown in FIGS. 2 and 3, a combination of a first holding portion 111 and a second holding portion 121 without a substrate as shown in FIG. 4 may be used.

The first holding portion 111 has a first outer circumferential surface (a curved surface)) 112, a first flat surface 113, and a first partial circular surface 114 on top thereof.

The second holding portion 121 has a second outer circumferential surface (a curved surface) 122, a second flat surface 123, and a second partial circular surface 124 on top thereof.

The first holding portion 111 and the second holding portion 121 are connected at the bottom (in a connected portion 120), which is on the axially opposite side of the first partial circular surface 114 and the second partial circular surface 124.

The first holding portion 111 and the second holding portion 121 are disposed such that the first flat surface 113 and the second flat surface 123 face each other with a gap 129 (an distance W1) therebetween.

The first holding portion 111 and the second holding portion 121 are disposed such that a planar shape including the gap 129 (the distance W1) between the first and second flat surfaces 113, 123 is circular.

Figure 5:
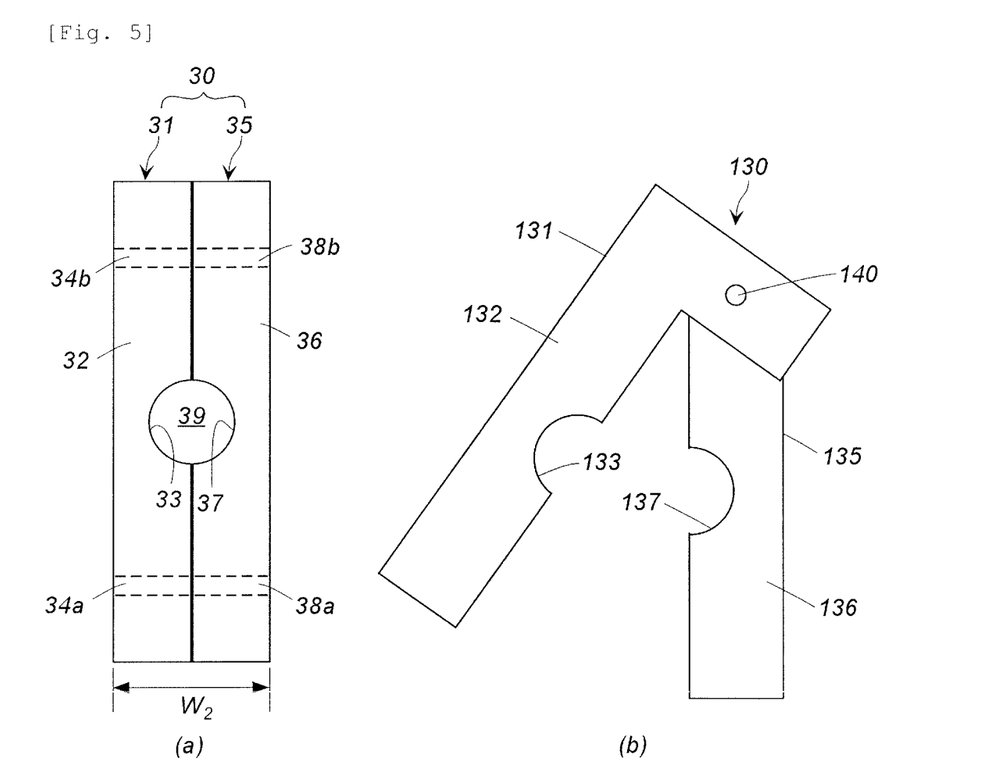
FIG. 5 shows, in (a), a plan view of a clamping tool shown in FIG. 1, and, in (b), a plan view of a clamping tool of another embodiment.

A clamping tool (a rod-shaped fixing device) 30 for the first measurement member 2 shown in FIG. 2 and (a) in FIG. 5 is a combination of a first rod-shaped member 31 and a second rod-shaped member 35.

The first and second rod-shaped members 31 and 35 are preferably made of stainless steel, iron, or the like.

The first rod-shaped member 31 has a first body portion 32 and a first concave portion 33 in a semi-columnar shape at the middle in a length direction of the first body portion 32.

A plurality of annular grooves are formed in a thickness direction in an inner circumferential surface of the first concave portion 33, and a plurality of annular projections 33a are formed between the plurality of annular grooves. The annular projections 33a are inclined toward the substrate 20.

The plurality of annular projections 33a have a distal end which has a triangular sectional shape, so that the annular projections 33a dig into and hold the circumferential wall 4 of the first measurement member 2.

The first rod-shaped member 31 has a first through-hole 34a and a second through-hole 34b formed near both ends thereof respectively. A thread ridge (for example, a thread ridge of a female screw) is formed in respective inner circumferential surfaces of the first and second through-holes 34a and 34b.

The second rod-shaped member 35 has a second body portion 36 and a second concave portion 37 in a semi-columnar shape at the middle in a length direction of the second body portion 36.

A plurality of annular grooves are formed in a thickness direction in an inner circumferential surface of the second concave portion 37, and a plurality of annular projections 37a are formed between the plurality of the annular grooves. The annular projections 37a are inclined toward the substrate 20.

The plurality of annular projections 37a have a distal end which has a triangular sectional shape, so that the annular projections 37a dig into and hold the circumferential wall 4 of the first measurement member 2.

The second rod-shaped member 35 has a first through-hole 38a and a second through-hole 38b formed near both ends thereof respectively.

The first concave portion 33 of the first rod-shaped member 31 and the second concave portion 37 of the second rod-shaped member 35 form a columnar space 39 when the first rod-shaped member 31 and the second rod-shaped member 35 are combined, and the columnar space 39 has such a size as to enclose the circumferential wall 4 of the first measurement member 2 from the outer side.

Moreover, a height of the columnar space 39 is the same as a thickness of the first and second rod-shaped members 31 and 35 and is smaller than a length of the first measurement member 2.

A length of the first and second rod-shaped members 31 and 35 is such that the respective through-holes are positioned outside the circle formed by the first and second holding portions 11 and 21 and the gap 29.

When the first rod-shaped members 31 and the second rod-shaped member 35 are combined, the center axis of the first through-hole 34a of the first rod-shaped member 31 coincides with the center axis of the first through-hole 38a of the second rod-shaped member 35, and the center axis of the second through-hole 34b of the first rod-shaped member 31 coincides with the center axis of the second through-hole 38b of the second rod-shaped member 35.

Due to this, as shown in FIG. 2, when a bolt (a male screw) 55 and a bolt (a male screw) 56 are inserted from the second rod-shaped member 35, it is possible to clamp and fix the first rod-shaped member 31 and the second rod-shaped member 35 so as to be integrated.

Instead of the combination of a through-hole and a bolt, a known clamping device such as a clamp, a rubber band, a metal band, or the like may be used.

When the first rod-shaped member 31 and the second rod-shaped member 35 are combined and integrated by the bolt (the male screw) 55 and the bolt (the male screw) 56, a total width W2 of the first and second rod-shaped members 31 and 35 is adjusted to be slightly smaller than the distance W1 of the gap 29 (the gap 129).

Instead of the clamping tool 30 for the first measurement member 2 shown in FIG. 2 and (a) in FIG. 5, a clamping tool 130 shown in (b) in FIG. 5 may be used.

The clamping tool 130 is a combination of a first rod-shaped member 131 and a second rod-shaped member 135, and the first rod-shaped member 131 and the second rod-shaped members 135 are fixed by a fixing pin 140 at one ends thereof, and the other ends thereof can be opened and closed relative to each other.

The first rod-shaped member 131 has a first body portion 132 and a first concave portion 133 in the same semi-columnar shape as the first concave portion 33, at the middle in the length direction of the first body portion 132.

The second rod-shaped member 135 has a second body portion 136 and a second concave portion 137 in the same semi-columnar shape as the second concave portion 37, at the middle in the length direction of the second body portion 136.

Similarly to the clamping tool 30, the first rod-shaped member 131 and the second rod-shaped member 135 may be clamped by a combination of a through-hole and a bolt arranged in the vicinity of the end on the opposite side of the fixing pin 140, or a clamping device such as a clamp, a rubber band, a metal band, or the like may be used.

The annular member 40 shown in FIG. 2 has an annular planar surface 41, a central hole 44, and an inner circumferential surface 42 and an outer circumferential surface 43 of the annular planar surface 41.

The annular planar surface 41 is abutted against the first partial circular surface 16 of the first holding portion 11 and the second partial circular surface 26 of the second holding portion 21.

The outer circumferential surface 43 of the annular planar surface faces the first inner circumferential surface (the curved surface) 13 and the second inner circumferential surface (the curved surface) 23.

An inner diameter of the central hole 44 of the annular planar surface 41 is the same as the distance (W1) between the first holding portion 11 and the second holding portion 21.

The inner diameter of the central hole 44 of the annular planar surface 41 is larger than the outer diameter of the circumferential wall 4 of the first measurement member 2.

The inner diameter of the central hole 44 of the annular planar surface 41 is the same as an inner diameter of the circumferential wall 7 of the second measurement member 5.

Figure 6:
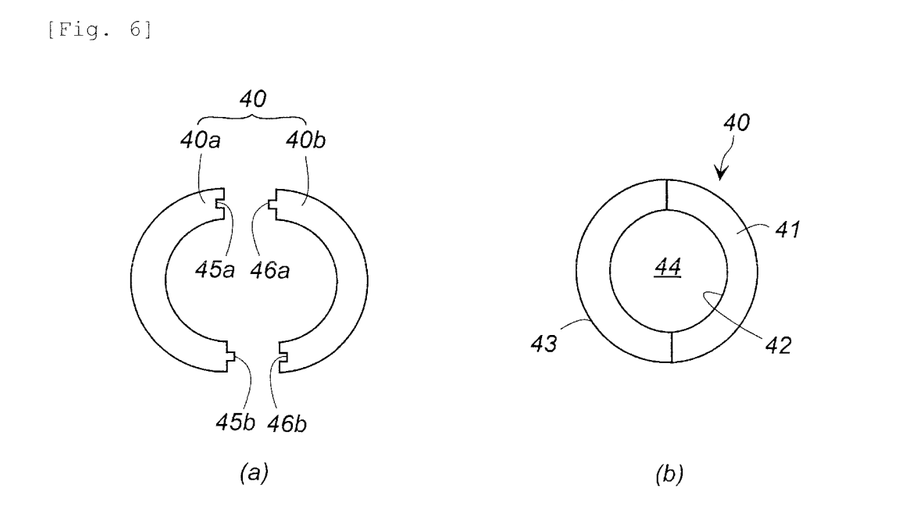
FIG. 6 shows, in (a), a plan view of another embodiment of an annular member shown in FIG. 2 and, in (b), a plan view illustrating a use state of the annular member shown in (a) in FIG. 6.
Figure 7:
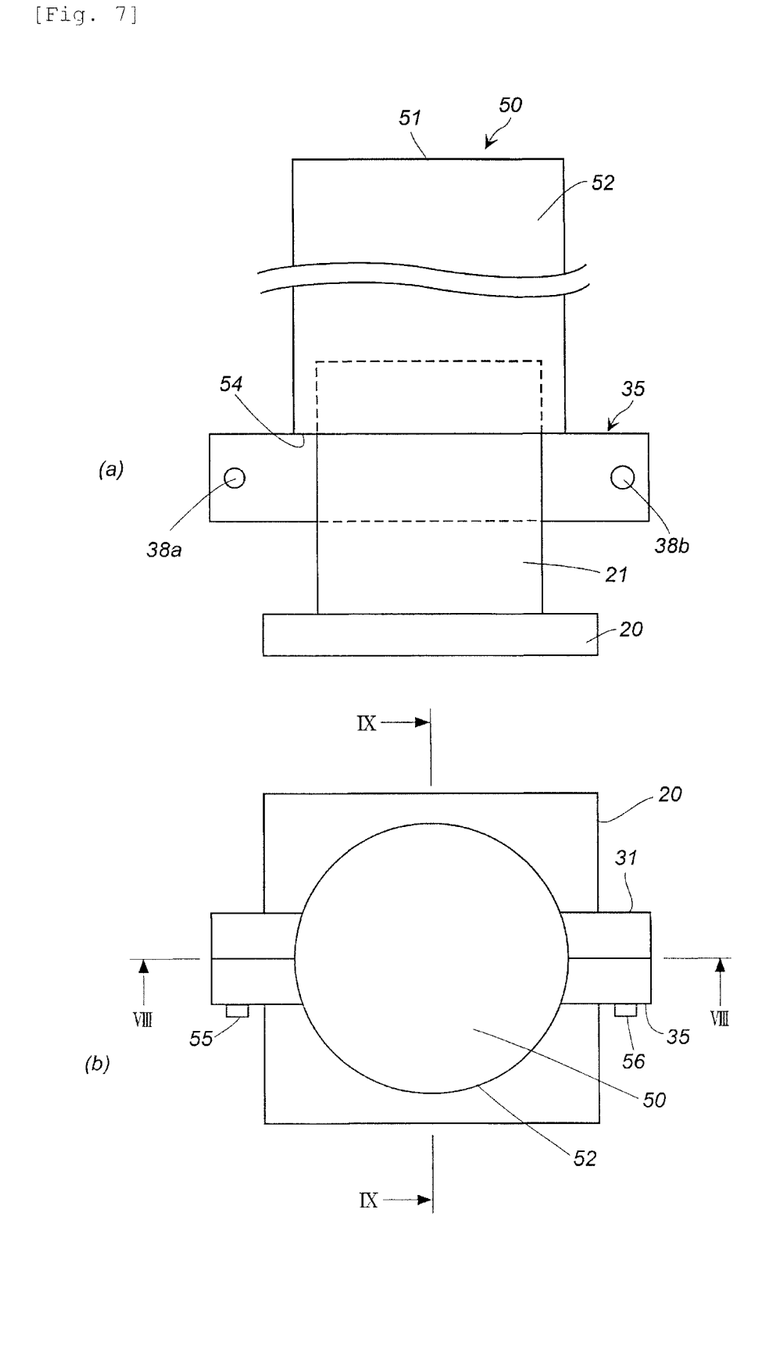
FIG. 7 shows, in (a), a front view of a measurement apparatus for implementing a measurement method according to the present invention and, in (b), a plan view of the measurement apparatus shown in (a) in FIG. 7.

As shown in (a) and (b) in FIG. 6, a combination of two members, i.e. a first annular member 40a and a second annular member 40b which are separable along a diameter passing through the center (the center of the central hole 44), may be used as the annular member 40.

When the annular member 40 includes the first annular member 40a and the second annular member 40b, in order to combine the first annular member 40a tightly with the second annular member 40b, a first recess 45a of the first annular member 40a may be fitted to a second protrusion 46a of the second annular member 40b, and a first protrusion 45b of the first annular member 40a may be fitted into a second recess 46b of the second annular member 40b as shown in (a) in FIG. 6, for example.

In this case, when assembled in the measurement apparatus, the connection portions of the first and second annular members 40a and 40b are preferably positioned on the first partial circular surface 16 of the first holding portion 11 and the second partial circular surface 26 of the second holding portion 21 and are not positioned over the gap 29.

A pressing portion (a load portion) 50 shown in FIG. 2 is a cup-shaped member having a bottom surface 51, a circumferential wall 52, an opening 53, and an annular end surface 54 of the opening 53 or may be a cylindrical member without the bottom surface 51.

The circumferential wall 52 and the opening 53 of the pressing portion 50 have a shape and a size such that the pressing portion 50 is fitted over the respective outer circumferential surfaces of the first holding portion 11 and the second holding portion 21.

A width (a thickness of the circumferential wall 52) of the annular end surface 54 is not particularly limited and is determined by adjusting dimensional relations with other components. The width is preferably equal to or larger than 5 mm from the view point of strength of the pressing portion and the easiness to transmit force when pressing.

The pressing portion 50 is preferably made of metal.

<Measurement Method>

A method for measuring connection strength of the measuring object 1 including the first measurement member 2 and the second measurement member 5 shown in FIG. 1 with the use of the above measurement apparatus will be described with reference to FIG. 2 and FIGS. 7 to 9.

<Step 1>

In step 1, the first concave portion 33 of the first rod-shaped member 31 and the second concave portion 37 of the second rod-shaped member 35 of the clamping tool 30 for the first measurement member 2 are arranged adjacent to each other to form the columnar space 39, and the annular member 40 is disposed at a position surrounding the columnar space 39.

In this case, the center of the columnar space 39 formed by the first and second rod-shaped members 31 and 35 preferably coincides with the center of the central hole 44 of the annular member 40, but the centers may be slightly shifted from each other in step 1.

<Step 2>

In step 2, the first measurement member 2 is passed through the central hole 44 of the annular member 40, and then, the annular protruding surface 6 (in a portion where the annular wall 6a is not formed) at the opening 5a of the second measurement member 5 is abutted against the annular planar surface 41 (the annular planar surface 41 close to the inner circumferential surface 42) of the annular member 40 so that the first measurement member 2 is positioned inside the columnar space 39 of the clamping tool The annular protruding surface 6 of the second measurement member 5 is abutted against the annular planar surface 41 of the annular member 40, and is not fixed thereto but axially supported thereby.

Since the circumferential wall 7 of the second measurement member 5 is not fixed by a fixing device, external force is not applied to the circumferential wall 7 during measurement.

In step 2, the first rod-shaped member 31 and the second rod-shaped member 35 are clamped by the clamping devices (the bolts) 55 and 56 to be integrated so that the first measurement member 2 is fixed in the columnar space 39.

The first through-hole 34a of the first rod-shaped member 31 and the first through-hole 38a of the second rod-shaped member 35 are fixed by the clamping device (the bolt) 55 and the second through-hole 34b of the first rod-shaped member 31 and the second through-hole 38b of the second rod-shaped member 35 are fixed by the clamping device (the bolt) 56.

In this case, since the second measurement member 5 is axially supported by the annular member 40 and the first measurement member 2 connected to the second measurement member 5 is also axially supported, a clamping and fixing operation is facilitated.

<Step 3>

Figure 8:
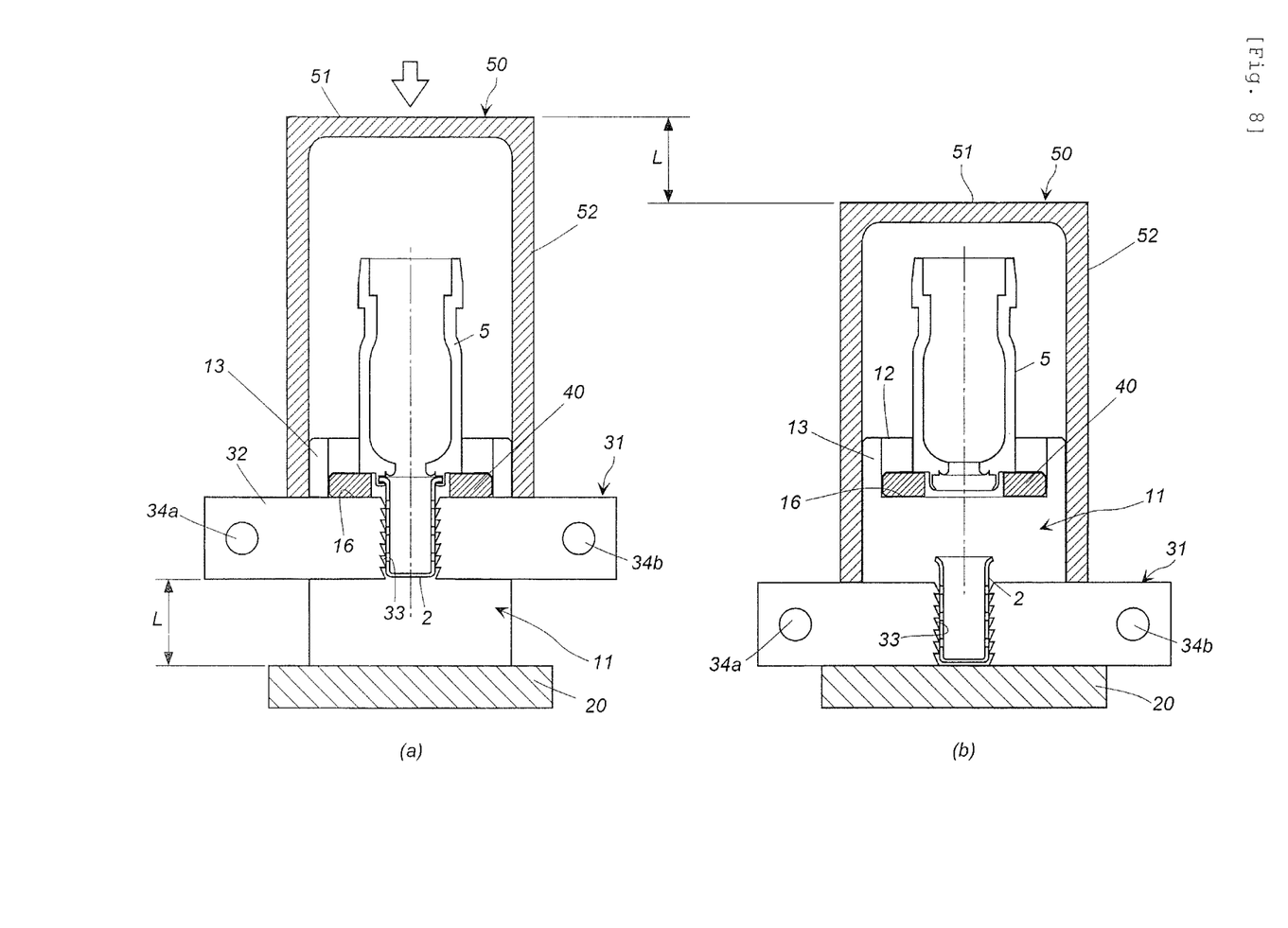
FIG. 8 shows, in (a), a cross-sectional view (a state before measurement) along VIII-VIII in (b) in FIG. 7 and, in (b), a cross-sectional view illustrating a state after measurement of (a) in FIG. 8.
Figure 9:
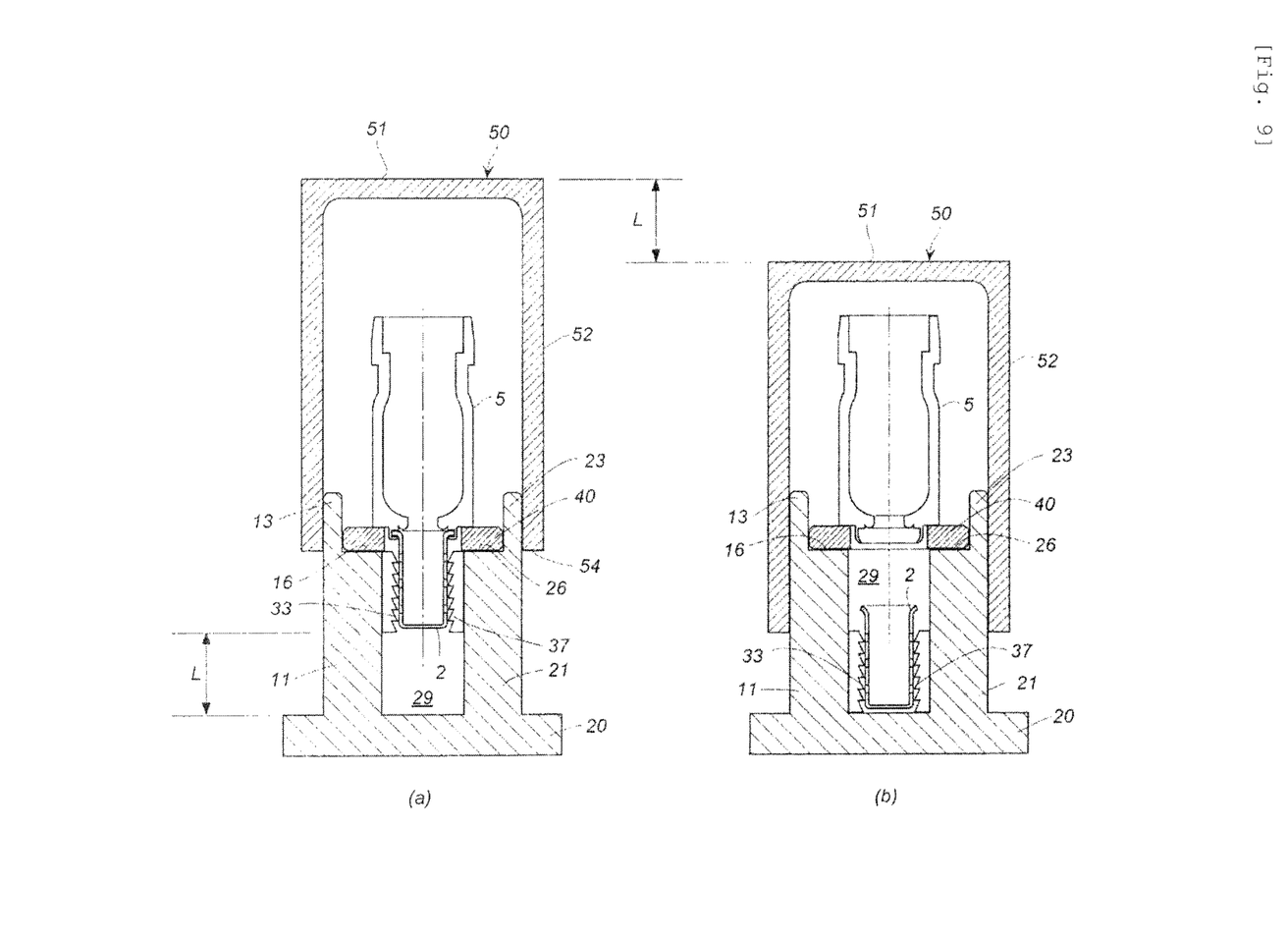
FIG. 9 shows, in (a), a cross-sectional view (the state before measurement) along IX-IX in (b) in FIG. 7 and, in (b), a cross-sectional view illustrating the state after measurement of (a) in FIG. 9.

In step 3, as shown in (a) in FIG. 8 and (a) in FIG. 9, the substrate 20 is placed on a flat surface (preferably a horizontal surface) of a working table or the like such that the first and second holding portions 11 and 21 on the substrate 20 are oriented vertically. In this state, the first and second rod-shaped members 31 and 35 (the total width W2) which fix the first measurement member 2, are disposed in the gap 29 (the distance W1) between the first and second holding portions 11 and 21, and the annular member 40 is abutted against the first partial circular surface 16 of the first holding portion 11 and the second partial circular surface 26 of the second holding portion 21.

In this case, the outer circumferential surface 43 of the annular member 40 faces the first inner circumferential surface (the curved surface) 13 and the second inner circumferential surface (the curved surface) 23 with a small gap therebetween.

The substrate 20 may be fixed to a measurement table by bolts in step 3 or before step 1 starts.

In step 2, the first rod-shaped member 31 and the second rod-shaped member 35 may be temporarily fixed by a rubber band or the like. Thereafter, in step 3, the first rod-shaped member 31 and the second rod-shaped member 35 may be disposed in the gap 29 (the distance W1) between the first holding portion 11 and the second holding portion 21 and then may be fixed by being clamped by the clamping devices 55 and 56.

As described above, the annular member 40 is abutted against the first partial circular surface 16 of the first holding portion 11 and the second partial circular surface 26 of the second holding portion 21. Thereby, the second measurement member 5 is axially supported, and the first measurement member 2 connected to the second measurement member 5 and the clamping tool 30 (the first and second rod-shaped members 31 and 35) which clamps and fixes the first measurement member 2, are suspended (held in the midair) in the gap 29 between the first and second holding portions 11 and 21.

When the substrate 20 (the first and second holding portions 11 and 21) is placed on a horizontal surface, the first measurement member 2 and the clamping tool 30 are suspended in a perpendicular direction.

<Step 4>

In step 4, the pressing portion (the cup member) 50 serving as the load portion is fitted over the first circumferential surfaces 12 of the first holding portions 11 and the second outer circumferential surfaces 22 of the second holding portions 21 from the outer side, and the annular end surface 54 of the pressing portion (the cup member) 50 is placed on the both ends of the clamping tool 30 (the first and second rod-shaped members 31 and 35).

The annular end surface 54 of the pressing portion (the cup member) 50 is positioned at an equal interval from the center axis of the columnar space 39 (the first measurement member 2) of the clamping tool 30.

Due to this, the center of the first measurement member 2, the center of the annular member 40, the center of the second measurement member 5, and the center of the pressing portion 50 coincide with one another.

<Step 5>

As shown in the changes from (a) to (b) in FIG. 8 and from (a) to (b) in FIG. 9, the pressing portion 50 is pressed downward (preferably in a perpendicular direction).

In this case, the clamping tool 30 is pressed downward by the pressing portion 50, the first measurement member 2 fixed to the clamping tool 30 is also pressed downward, and the force acts such that the connection portion of the first measurement member 2 and the second measurement member 5 is separated because the second measurement member 5 is axially supported by the annular member 40 disposed across the first and second holding portions 11 and 21. Moreover, the annular projections 33a and 37a are inclined toward the substrate 20 and the distal ends thereof hold the circumferential wall 4 of the first measurement member 2 from the outer side.

Due to this, the first measurement member 2 and the second measurement member 5 are separated by pressing downward the pressing portion 50, and connection strength is measured from a load applied to the pressing portion 50 when the members are separated.

In addition to this, a load applied when destruction, deformation, or the like occurs in one or both of the flange 3 of the first measurement member 2 and the annular wall 6a of the second measurement member 5 may be measured as the connection strength.

In step 5, since the circumferential wall 4 of the first measurement member 2 is uniformly fixed from the outer side by the clamping tool 30 and the clamping tool 30 is moved straightly in the axial direction, portions other than the flange 3 in the first measurement member 2 are hardly deformed. Moreover, since the second measurement member 5 is not fixed but only axially supported, the second measurement member 5 is not deformed, and thereby, accurate connection strength is measured.

Since the measurement method of the present invention has the above-described features, it is possible to measure the connection strength between the first measurement member 2 and the second measurement member 5 accurately.

Other Embodiments

The measurement method of the present invention may be implemented in a state in which the entire measurement apparatus is placed laterally or obliquely.

Figure 10:
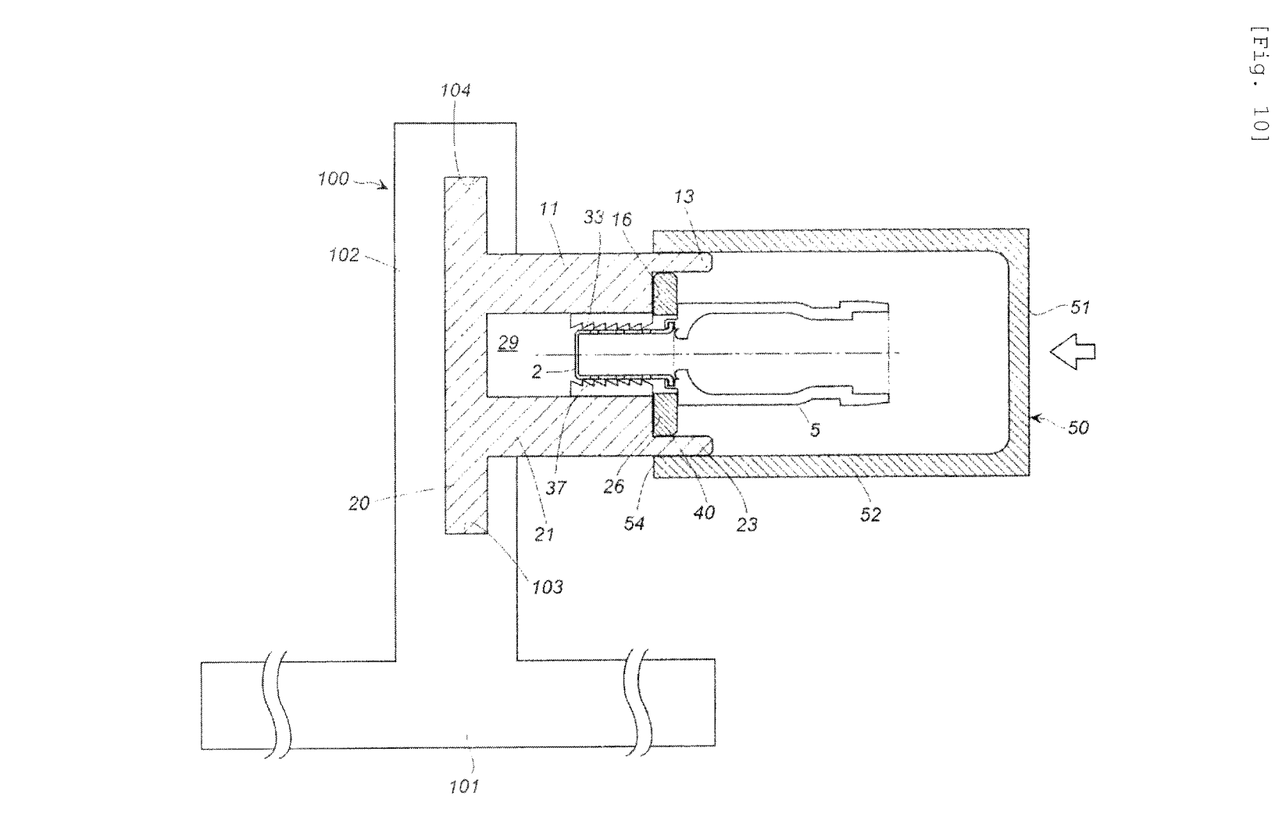
FIG. 10 shows a cross-sectional view in an axial direction (the axial direction of the measurement apparatus) for illustrating another embodiment of the measurement method according to the present invention.

For example, measurement may be conducted in a state in which the substrate 20 having bolt holes formed in four corners thereof is fixed to a vertical surface or an inclined surface by bolts, or measurement may be conducted with a jig 100 as shown in FIG. 10.

A measurement apparatus shown in FIG. 10 is obtained by laterally (preferably, in a horizontal direction) fixing the apparatus in the state shown in (a) in FIG. 9 (that is, also in the state shown in (a) in FIG. 8).

In FIG. 10, a metallic jig 100 for fixing the measurement apparatus is used.

The jig 100 has a base 101 which has a rectangular planar shape, a supporting wall 102 which is vertically provided on an intermediate portion in a length direction of the base 101, a first groove 103 which is formed on the side of a lower end (on the side of the base 101) of the supporting wall 102, and a second groove 104 which is formed on the side of an upper end of the supporting wall 102.

A planar shape of the supporting wall 102 is the same as the shape of the substrate 20 to which the first and second holding portions 11 and 21 are fixed.

A width and a length of the first groove 103 and a width and a length of the second groove 104 correspond to a thickness and a length of the substrate 20 to which the first and second holding portions 11 and 21 are fixed.

As shown in FIG. 10, the substrate 20 is slid and fitted to both the first and second grooves 103 and 104 to be fixed thereto.

By using the jig 100 shown in FIG. 10, measurement is conducted in a state in which the measurement apparatus is set in a lateral direction (a horizontal direction). Moreover, by adjusting the angle between the base 101 and the supporting wall 102, measurement is conducted in a state in which the measurement apparatus is set in an oblique direction.

When measurement is conducted in the state shown in FIG. 10, it is preferable that the substrate 20 is fixed to the jig 100 before step 1 starts.

When measurement is conducted in the state shown in FIG. 10, the load portion 50 is pressed in a lateral direction (preferably a horizontal direction) in step 5 so that the connection portion of the first measurement member 2 and the second measurement member 5 is separated similarly to the change from (a) to (b) in FIG. 9.

Although the jig 100 is used in FIG. 10, the measurement apparatus can be fixed without using the jig but with a working table or a wall surface to conduct the measurement.

A form and a size of the respective components of the measurement apparatus used in the measurement method of the present invention can be adjusted to correspond to a shape (a sectional shape) and a size of a measuring object so that measurement is facilitated.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for measuring connection strength of a measuring object in which a first measurement member and a second measurement member are connected,
   the measuring object being an object in which the first measurement member in the form of a cylindrical member or a cup member, and the second measurement member in the form of a cylindrical member or a cup member, are connected at respective openings thereof,
   the method comprising the steps of:
   fixing the first measurement member by enclosing a circumferential wall thereof from the outer side, and axially supporting but not fixing an annular end surface of an opening of the second measurement member;
   holding in midair the first measurement member fixed; and
   pulling away the first measurement member from the second measurement member until a connection portion of the first measurement member and the second measurement member is separated.

2. The method for measuring the connection strength of the measuring object according to claim 1, wherein an outer diameter (d1) of the first measurement member and an inner diameter (d2) of the second measurement member satisfy a relation of d2≥d1, and a thickness (t1) of the circumferential wall of the first measurement member and a thickness (t2) of the circumferential wall of the second measurement member satisfy a relation of t2≥t1.

3. The method for measuring the connection strength of the measuring object according to claim 1, wherein the opening of the second measurement member connected to the first measurement member has an annular protruding surface which protrudes inward in a radial direction of the opening,
   an outer diameter (d1) of the first measurement member and an inner diameter (d2) of the second measurement member where the annular protruding surface is not formed satisfy a relation of d2≥d1, and a thickness (t1) of the circumferential wall of the first measurement member and a thickness (t2) of the circumferential wall of the second measurement member where the annular protruding surface is not formed satisfy a relation of t2≥t1, and
   in the step of holding, the annular end surface of the second measurement member including the annular protruding surface is not fixed but axially supported.

4. The method of measuring the connection strength of the measuring object according to claim 1, wherein the first measurement member has a flange at an opening thereof, the second measurement member has an annular wall formed on the annular end surface of the opening so as to axially protrude, and the flange of the first measurement member and the annular wall of the second measurement member are connected by being bent in opposite directions.

5. The method of measuring the connection strength of the measuring object according to claim 1, wherein a device for fixing the first measurement member used in the step of fixing by enclosing the circumferential wall of the first measurement member from the outer side is a combination of two rod-shaped fixing devices capable of clamping and fixing the circumferential wall of the first measurement member at a middle in a length direction thereof from the outer side, the device for axially supporting but not fixing the annular end surface of the opening of the second measurement member is an annular member disposed at the middle in the length direction of the two rod-shaped fixing devices, the annular member having a hole having a shape and a size such that the first measurement member passes through the hole, a device used in the step of holding for holding the first measurement member fixed in the step of fixing in the midair is a first holding portion and a second holding portion disposed to face each other with a gap therebetween so that the annular member is placed across the first holding portion and the second holding portion, a device used in the step of pulling away for pulling away the first measurement member from the second measurement member until the connection portion of the first measurement member and the second measurement member is separated is a cup member or a cylindrical member which is fitted over an outer side of the second measurement member such that an end surface of the opening thereof is abutted against both ends of the two rod-shaped fixing devices, in the step of fixing, the annular member is disposed at the middle in the length direction of the two rod-shaped fixing devices, then the first measurement member is passed through the hole of the annular member so that the annular end surface of the opening of the second measurement member is axially supported but not fixed, and thereafter, the circumferential wall of the first measurement member is clamped and fixed from the outer side by the two rod-shaped fixing devices, in the step of holding, the annular member is placed across both the first holding portion and the second holding portion so that the two rod-shaped fixing devices and the first measurement member are disposed in the gap between the first holding portion and the second holding portion in a state of being held in the midair, and in the step of pulling away, the cup member or the cylindrical member is provided from the second measurement member so that the end surface of the opening of the cup member or the cylindrical member is abutted against the both ends of the two rod-shaped fixing devices, and the cup member or the cylindrical member is pressed until the connection portion of the first measurement member and the second measurement member is separated.

* * * * *